United States Patent
Lee et al.

(10) Patent No.: US 12,055,732 B2
(45) Date of Patent: Aug. 6, 2024

(54) MULTIFOCAL LENS

(71) Applicant: SUPERLEE CORPORATION, Tainan (TW)

(72) Inventors: Tsung-Keng Lee, Tainan (TW); Meng-Huang Lin, Tainan (TW)

(73) Assignee: Superlee Corporation, Tainan (TW)

( * ) Notice: Subject to any disclaimer, the term of this patent is extended or adjusted under 35 U.S.C. 154(b) by 311 days.

(21) Appl. No.: 17/707,142

(22) Filed: Mar. 29, 2022

(65) Prior Publication Data

US 2023/0314667 A1    Oct. 5, 2023

(51) Int. Cl.
*G02B 3/10* (2006.01)
(52) U.S. Cl.
CPC .................................. *G02B 3/10* (2013.01)
(58) Field of Classification Search
CPC ........ G02B 15/14; G02B 7/04; G02B 13/009; G02B 3/10
See application file for complete search history.

(56) References Cited

U.S. PATENT DOCUMENTS

| | | | |
|---|---|---|---|
| 6,536,923 B1* | 3/2003 | Merz | F21V 7/0091 362/336 |
| 2018/0149333 A1* | 5/2018 | Kumar | F21S 41/275 |

\* cited by examiner

*Primary Examiner* — Joseph P Martinez
(74) *Attorney, Agent, or Firm* — Rosenberg, Klein & Lee (57) ABSTRACT

A multifocal lens is revealed. The multifocal lens includes a lens with an incident curved surface and an emergent curved surface arranged opposite to each other. The incident curved surface consists of a plurality of incident areas disposed circularly around an axis of the lens and each of the incident areas is formed by a plurality of incident surfaces. The two adjacent incident surfaces belonged to the same incident area are not in contact with each other optimally and the incident areas have respective focal points correspondingly. Thereby light with different properties emitted from a plurality of light sources corresponding to the focal points of the respective incident areas is passed through the multifocal lens and projected to have preset light patterns for warning or decoration.

15 Claims, 13 Drawing Sheets
(4 of 13 Drawing Sheet(s) Filed in Color)

MULTIFOCAL LENS

BACKGROUND OF THE INVENTION

Field of the Invention

The present invention relates to a multifocal lens, especially to a multifocal lens in which an incident curved surface of a lens is provided with a plurality of incident areas arranged circularly around an axial direction of the multifocal lens and each of the incident areas has a corresponding focal point. Thereby light emitted from light sources with different luminescence properties located at the respective focal points correspondingly is passed through the lens and projected to provide preset light patterns.

Description of Related Art

A light fixture available now includes a light source disposed on one side of a light guide component. Once the light source is on, a light spot is generated on one end of the light guide component opposite to the end with the light source. In order to make light emitted from a peripheral surface of the light guide component, the peripheral surface is processed by surface roughening treatment. Thus the light is projected from the peripheral surface of the light guide component. Such kind of light fixture can combine light sources with different luminous properties. However, either the power or the number of the light sources used in the light fixture needs to be increased in order to meet motor vehicle safety standards. Yet the increased power and number of the light sources both cause a heat problem which further affects service life of the light sources.

A lens includes an incident surface and an emergent surface opposite to each other and a light source arranged at the incident surface. This is another type of light fixture which not only provides illumination or warning signals but also improves the heat problem. Yet this type of light fixture has a shortcoming of a single function which is unable to meet ever-changing consumer demands.

There is room for improvement and there is a need to provide a lens which not only alleviates the heat problem but also changes light patterns easily and uses more light sources with different colors to make the light fixture formed have more applications.

SUMMARY OF THE INVENTION

Therefore, it is a primary object of the present invention to provide a multifocal lens in which an incident curved surface of a lens is composed of a plurality of incident areas and each of the incident areas includes a plurality of incident surfaces. Each of the incident areas is corresponding to a focal point and a light source is arranged at the focal point. The multifocal lens has a multifunctional feature by control of light emitted from a plurality of light sources with different properties (such as light colors) and passed through the same lens to generate a plurality of light patterns.

In order to achieve the above object, a multifocal lens according to the present invention includes a lens provided with an incident curved surface and an emergent curved surface arranged opposite to each other. The incident curved surface consists of a plurality of incident areas disposed circularly around an axis which is disposed axially in the lens and each of the incident areas is formed by a plurality of incident surfaces. The incident surfaces of the same incident area are not adjacent to and in contact with one another and each of the incident areas has its own focal point.

The multifocal lens of the present invention has the following advantages. By the plurality of incident surfaces of the incident curved surface of the lens corresponding to different focal points, especially the two adjacent incident surfaces corresponding to different focal points, and the light sources on the respective focal points having different spectra, light patterns projected from the emergent curved surface of the multifocal lens approach the same but with different spectra when the respective light sources with different spectra are lit. Thus not only the shortcoming of the vehicle lights available now which generates monotonic spectrum by using a single lens in combination with a single light source can be overcome, the vehicle lights can also have more styles under the condition that luminous intensity meets regulatory requirements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
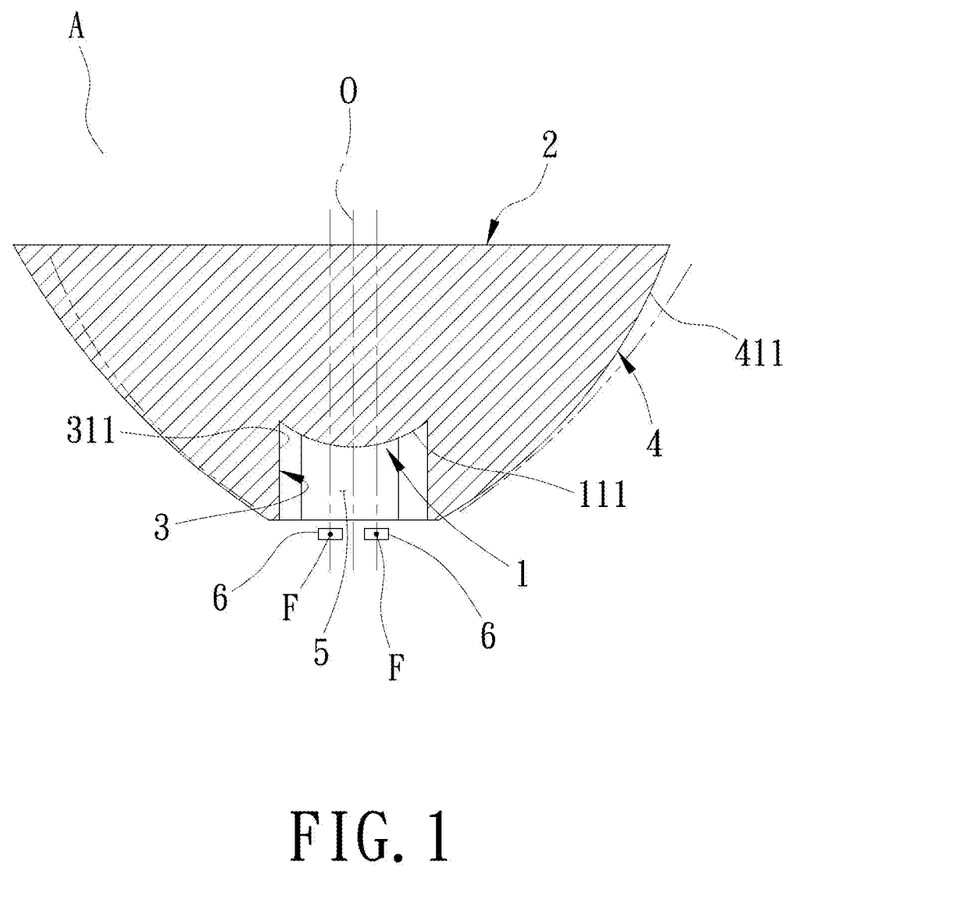
FIG. 1 is a side sectional view of an embodiment of a multifocal lens according to the present invention.
Figure 2:
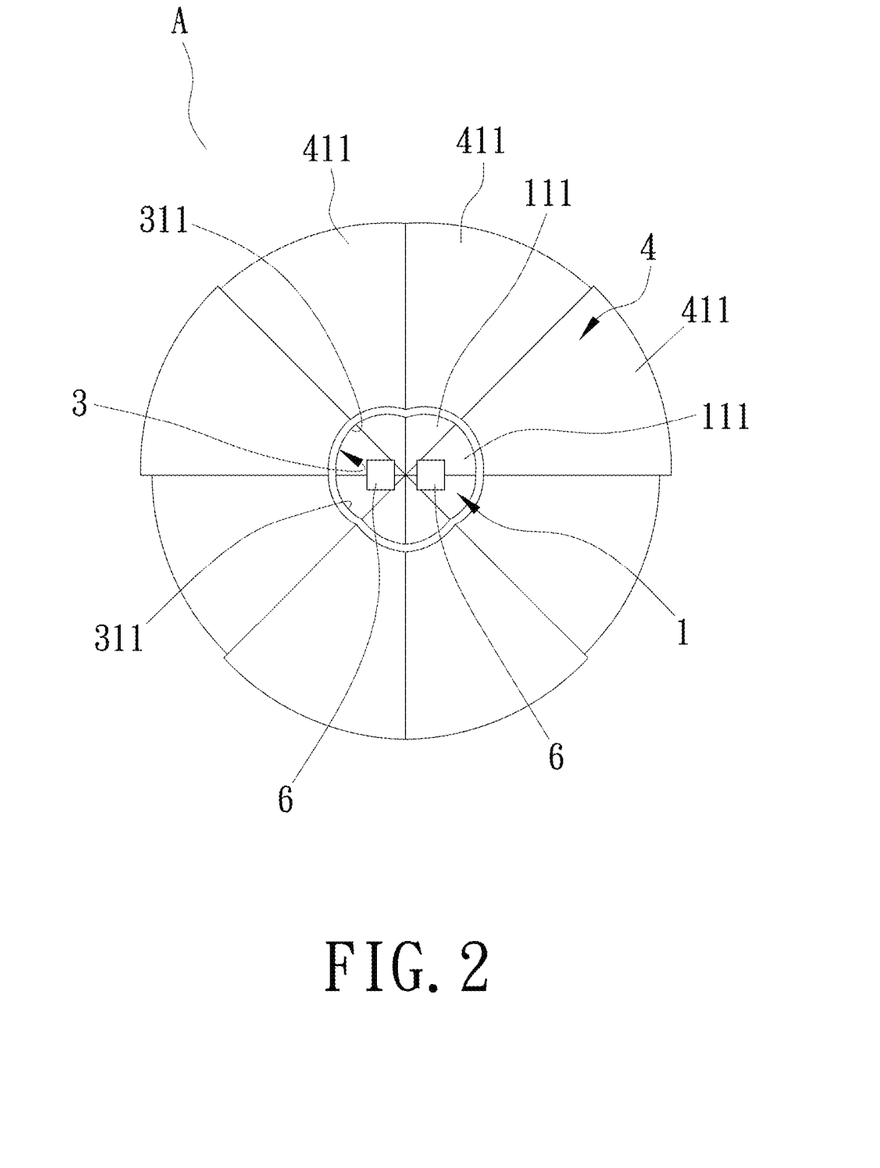
FIG. 2 is a schematic drawing showing a top view of an embodiment which includes two focal points (light source) and a lens with a plurality of surfaces equi-angularly divided into eight equal parts according to the present invention.

Refer to FIG. 1 and FIG. 2, a multifocal lens according to the present invention is a lens A which includes an incident curved surface 1 and an emergent curved surface 2 arranged opposite to each other.

The incident curved surface 1 is provided with a plurality of incident areas disposed circularly around an axis O and each of the incident areas is formed by a plurality of incident surfaces 111 arranged circularly around the axis O which is preferably arranged axially in the lens A. Preferably, the axis O is the central axis of the lens A. The incident surfaces 111 belonged to the same incident area are not adjacent to and in contact with one another and each of the incident areas has its own focal point F correspondingly.

In a preferred embodiment, the incident surfaces 111 are equi-angularly arranged around the axis O. The number of the incident surfaces 111 is a multiple of the number of the plurality of focal points F. Each of the focal points F is sequentially corresponding to each of the incident surfaces 111 in an alternate manner and the two adjacent incident surfaces 111 are corresponding to the different focal points F. The greater the multiple, the more incident surfaces 111 each of the focal points F is corresponding to. Thus a light pattern generated by light projected from a light source at each of the focal points F and passed through the lens A is approaching the same.

Under the condition that the number of the incident surfaces 111 is a multiple of the number of the plurality of focal points F, the number of the incident surfaces 111 is 4(2*2), 6(2*3), 8(2*4) . . . respectively when there are two focal points F and the number of the incident surfaces 111 is 2, 3, 4 . . . times of the number of the focal point F. If there are four focal points F and the number of the incident surfaces 111 is 3, 4, 5 . . . times of the number of the focal points F, the number of the incident surfaces 111 is 12(4*3), 16(4*4), 20(4*5) . . . respectively.

Figure 3:
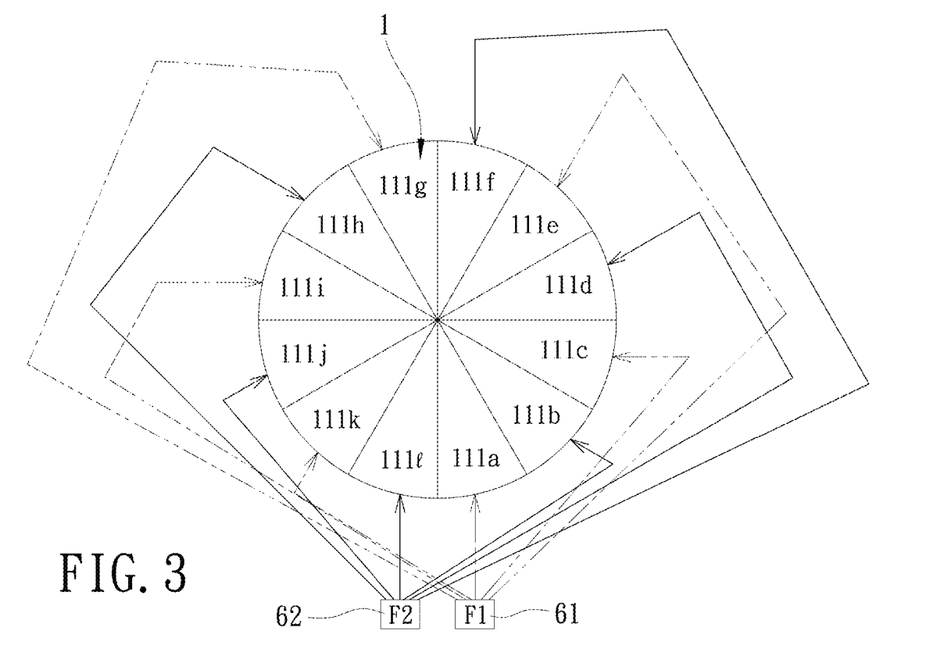
FIG. 3 is a schematic drawing showing an embodiment in which two focal points (light sources) are sequentially corresponding to twelve equi-angularly divided incident surfaces (emergent surfaces) in an alternate manner according to the present invention.

Take the embodiment in FIG. 3 as an example. The embodiment in FIG. 3 which includes two focal points F1 and F2 and twelve incident surfaces 111. The two focal points F1 and F2 are corresponding to the respective incident surfaces 111a-111l alternately. As shown in FIG. 3, the focal point F1 is corresponding to the incident surfaces 111a, 111c, 111e, 111g, 111i, 111k while the focal point F2 is corresponding to the incident surfaces 111b, 111d, 111f, 111h, 111j, 111l. To put it another way, the focal point of the incident surfaces 111a, 111c, 111e, 111g, 111i, 111k is F1 while the focal point of the incident surfaces 111b, 111d, 111f, 111h, 111j, 111l is F2. The incident surfaces 111a, 111c, 111e, 111g, 111i, 111k form a first incident area and the incident surfaces 111b, 111d, 111f, 111h, 111j, 111l form a second incident area. That is to say, the incident curved surface 1 includes the first incident area and the second incident area. The first incident area is composed of the incident surfaces 111a, 111c, 111e, 111g, 111i, 111k while the second incident area is provided with the incident surfaces 111b, 111d, 111f, 111h, 111j, 111l form. All of the incident surfaces 111a-111l are distributed circularly around an axis O (which is preferably a central axis of a lens A). The six incident surfaces 111a, 111c, 111e, 111g, 111i, 111k of the first incident area are not adjacent to and in contact with each other. The six incident surfaces 111b, 111d, 111f, 111h, 111j, 111l of the second incident area are not adjacent to and in contact with each other. The six incident surfaces 111a, 111c, 111e, 111g, 111i, 111k of the first incident area and the six incident surfaces 111b, 111d, 111f, 111h, 111j, 111l of the second incident area are respectively corresponding to the focal point F1 and the focal point F2. In a preferred embodiment, all of the incident surfaces 111a-111l are equi-angularly disposed around the axis O (which is preferably the central axis of a lens A) with the same central angle.

Figure 4:
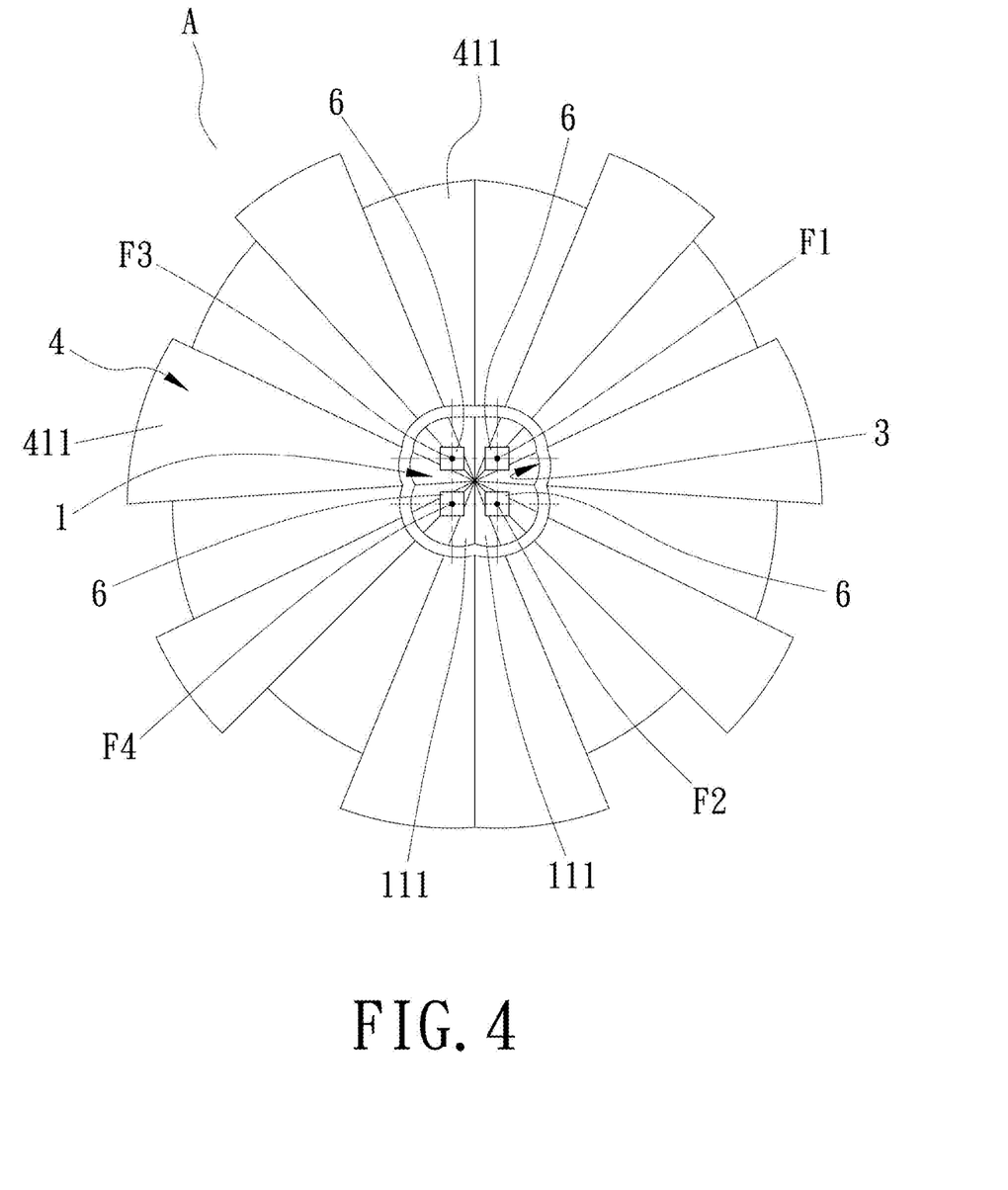
FIG. 4 is a schematic drawing showing a top view of an embodiment which includes four focal points (light source) and a lens with a plurality of surfaces equi-angularly divided into sixteen parts according to the present invention.
Figure 5:
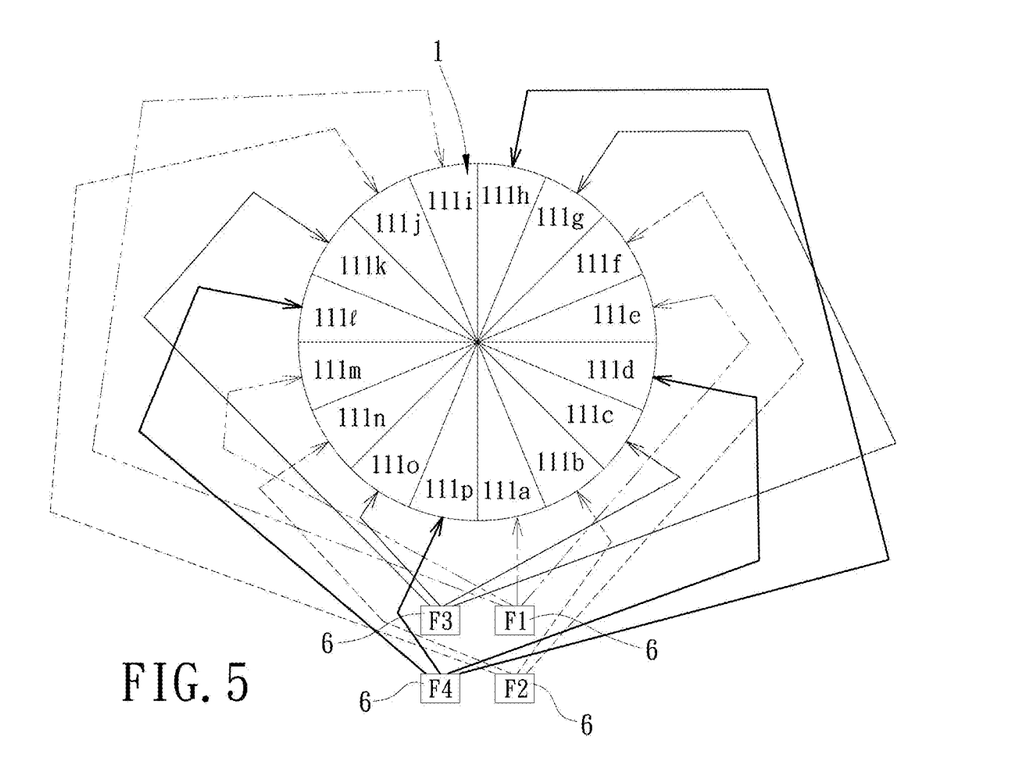
FIG. 5 is a schematic drawing showing an embodiment in which four focal points (light sources) are sequentially corresponding to sixteen equi-angularly divided incident surfaces (emergent surfaces) in an alternate manner according to the present invention.

Refer to FIG. 4 and FIG. 5, another embodiment which is provided with four focal points (F1, F2, F3, and F4) and sixteen incident surfaces 111 equal to one another is revealed. The four focal points F1, F2, F3, and F4 are sequentially corresponding to the respective incident surfaces 111a-111p in an alternate manner. As shown in FIG. 5, the focal point F1 is corresponding to the incident surfaces 111a, 111e, 111i, and 111m and the focal point F2 is corresponding to the incident surfaces 111b, 111f, 111j, and 111n. The focal point F3 is corresponding to the incident surfaces 111c, 111g, 111k, and 111o and the focal point F4 is corresponding to the incident surfaces 111d, 111h, 111l, and 111p. The incident curved surface 1 includes a first incident area, a second incident area, a third incident area, and a fourth incident area while the incident surfaces 111a, 111e, 111i, and 111m constitute the first incident area without being adjacent to and in contact with each other. Similarly, the incident surfaces 111b, 111f, 111j, and 111n which are not adjacent to and in contact with each other compose the second incident area. The third incident area consists of the incident surfaces 111c, 111g, 111k, and 111o which are not adjacent to and in contact with each other while the incident surfaces 111d, 111h, 111i, and 111p which are not adjacent to and in contact with each other compose the fourth incident area. All of the incident surfaces 111a-111p are circularly disposed around an axis O (which is preferably the central axis of a lens A). In a preferred embodiment, all of the incident surfaces 111a-111p are circularly arranged around the axis O and having the same central angle.

To put it another way, the focal point of the incident surfaces 111a, 111e, 111i, and 111m is F1 while the focal point of the incident surfaces 111b, 111f, 111j, and 111n is F2. The focal point of the incident surfaces 111c, 111g, 111k, and 111o is F3 while the focal point of the incident surfaces 111d, 111h, 111l, and 111p is F4. When a light source 6 at the first focal point F1 is turned on, most of light from the light source 6 is incident on the incident surfaces 111a, 111e, 111i, and 111m. When a light source 6 at the second focal point F2 is lit, most of light from the light source 6 is entering the incident surfaces 111b, 111f, 111j, and 111n. When a light source 6 at the third focal point F3 is turned on (at the third focal point F3), most of light from the light source 6 is incident on the incident surfaces 111c, 111g, 111k, and 111o. When a light source 6 at the fourth focal point F4 is turned on, most of light from the light source 6 is entering the incident surfaces 111d, 111h, 111l, and 111p.

When the more incident surfaces 111 are provided, the light pattern generated by light projected from the light source at each of the focal points F and passed through the lens A is more consistent, even the incident surfaces 111 of the lens A don't comply with at least one of the following conditions (I) the incident surfaces 111 are equi-angularly arranged. (II) the number of the incident surfaces ill is an integer multiple of the number of the focal points F. (III) the plurality of focal points are sequentially corresponding to the plurality of the incident surfaces 111 in an alternate manner.

The lens A further includes an inner light-collecting curved surface 3 and an outer reflective curved surface 4, as shown in FIG. 1. The inner light-collecting curved surface 3 which is connected with the incident curved surface 1 works together with the incident curved surface 1 to define a slot 5 while the outer reflective curved surface 4 connects the inner light-collecting curved surface 3 and the emergent curved surface 2.

The inner light-collecting curved surface 3 includes a plurality of inner light-collecting areas disposed circularly around an axis O and each of the inner light-collecting areas is composed of a plurality of inner light-collecting surfaces 311 equi-angularly and circularly arranged around the axis O which is an axis in the lens A. In a preferred embodiment, the axis O is the central axis of the lens A. The respective inner light-collecting surfaces 311 in the same inner light-collecting area are not adjacent to and in contact with one another and each of the inner light-collecting areas has its own focal point F. The inner light-collecting surfaces 311 are equi-angularly arranged circularly around the axis O (preferably disposed in the axial direction of the lens A, especially the central direction of the lens A). The number of the inner light-collecting surfaces 311 is preferred an integer multiple of the number of the focal points F. The focal points F are sequentially corresponding to the inner light-collecting surfaces 311 in an alternate manner and the two adjacent inner light-collecting surfaces 311 are corresponding to the different focal points F. The greater the multiple, the more inner light-collecting surfaces 311 each of the focal points F is corresponding to. Thus light pattern generated by light projected from light sources at each of the focal points F and passed through the lens A is approaching the same.

In a preferred embodiment, the outer reflective curved surface 4 similarly includes a plurality of outer reflective areas disposed circularly around an axis O (preferably disposed axially in the lens A, especially the central axis of the lens A) and each of the outer reflective areas is formed by a plurality of outer reflective surfaces 411 equi-angularly arranged around the axis O circularly. In a preferred embodiment, the number of the outer reflective surfaces 411 is an integer multiple of the number of the focal points and each of the focal points F is sequentially corresponding to each of the outer reflective surfaces 411 in an alternate manner while the two adjacent the outer reflective surfaces 411 are corresponding to the different focal points F. The greater the multiple, the more outer reflective surfaces 411 each of the focal points F is corresponding to. Thus light pattern generated by light projected from the light source at each of the focal points F and passed through the lens A is approaching the same. Moreover, the inner light-collecting curved surface 3 and the outer reflective curved surface 4 are designed in the same way as the incident curved surface 1.

Each of the focal points F is provided with a light source 6. When the light sources 6 with different spectra are selected and used in the present multi-focal lens, the light sources 6 with different spectra can be turned on at different time points to generate light patterns which are approaching the same.

Figure 6:
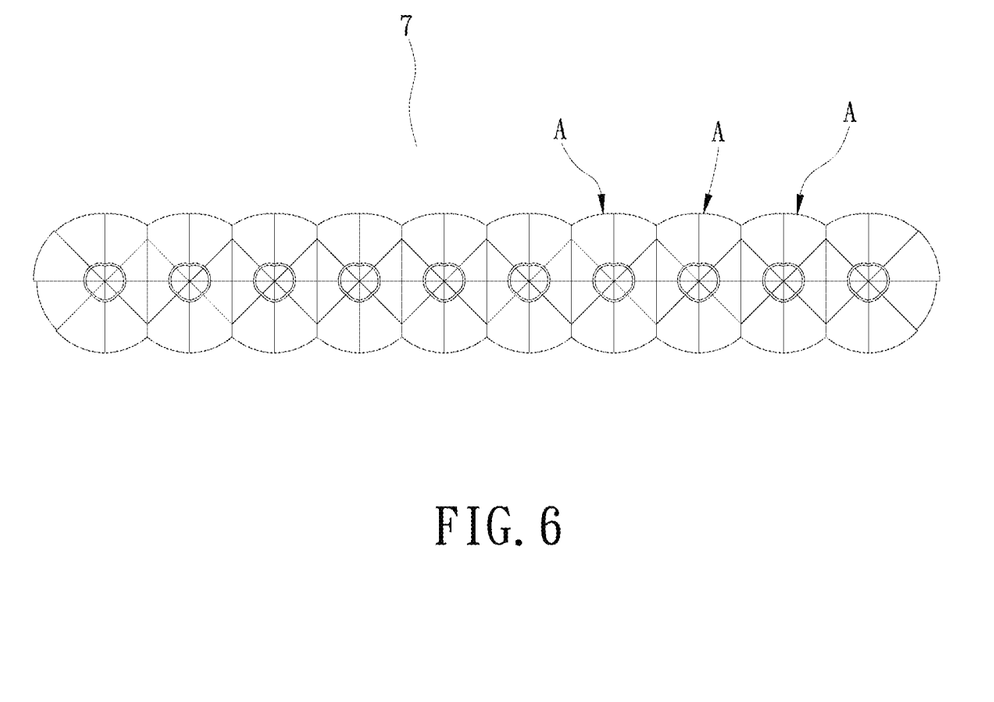
FIG. 6 is a schematic drawing showing a strip light formed by a plurality of lenses each of which is provided with a plurality of surfaces equi-angularly divided into eight parts according to the present invention.
Figure 7:
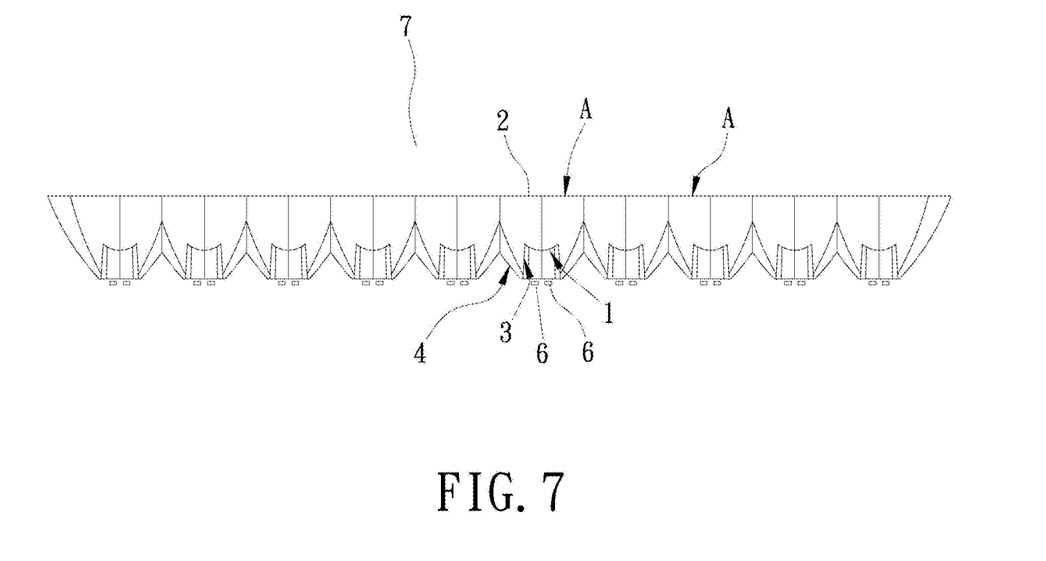
FIG. 7 is a schematic drawing showing each of the lenses of the strip light in FIG. 6 provided with two light sources according to the present invention.
Figure 8:
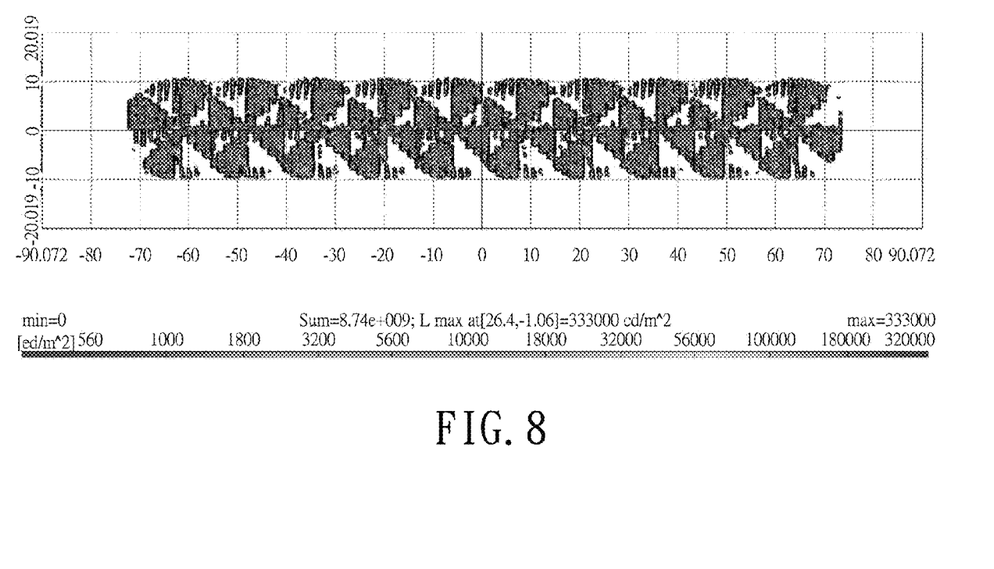
FIG. 8 is a schematic drawing showing light patterns generated after one of the light sources in FIG. 7 turned on according to the present invention.
Figure 9:
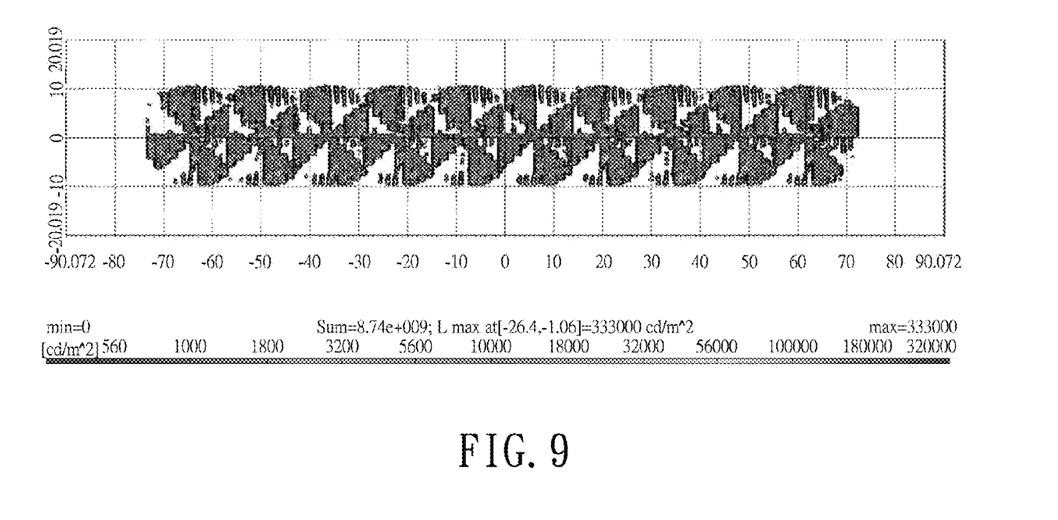
FIG. 9 is a schematic drawing showing light patterns generated after the other light source in FIG. 7 turned on according to the present invention.

For example, a plurality of the multifocal lenses A is connected to form a strip light 7, as shown in FIG. 6 and FIG. 7. The incident curved surface 1, the inner light-collecting curved surface 3, and the outer reflective curved surface 4 of the respective lenses A are equi-angularly divided into eight equal parts and each of the lenses A is provided with two light sources 61, 62. Refer to FIG. 8, light patterns generated after light from all of the light sources 61 passed through the lenses A is disclosed. The FIG. 9 shows light patterns generated by light emitted from all of the light sources 62 and passed through the lenses A.

Figure 10:
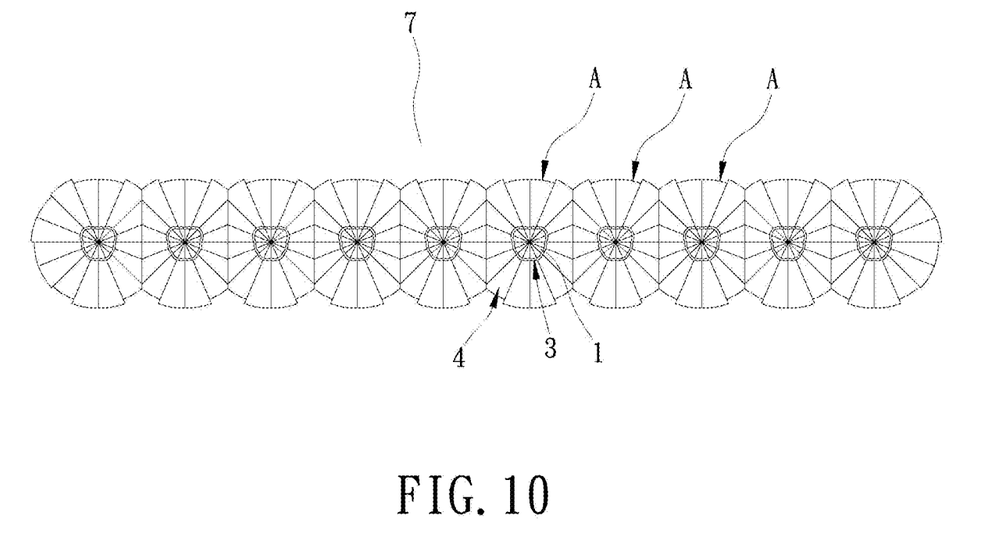
FIG. 10 is a schematic drawing showing a strip light formed by a plurality of lenses each of which is provided with a plurality of surfaces equi-angularly divided into sixteen parts according to the present invention.
Figure 11:
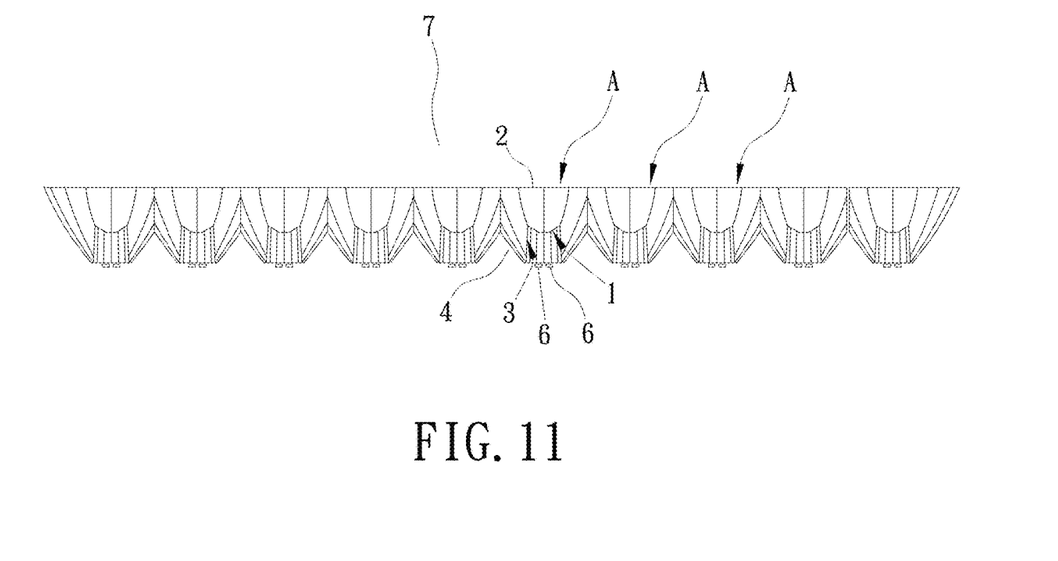
FIG. 11 is a schematic drawing showing each of the lenses of the strip light in FIG. 10 provided with two light sources according to the present invention.
Figure 12:
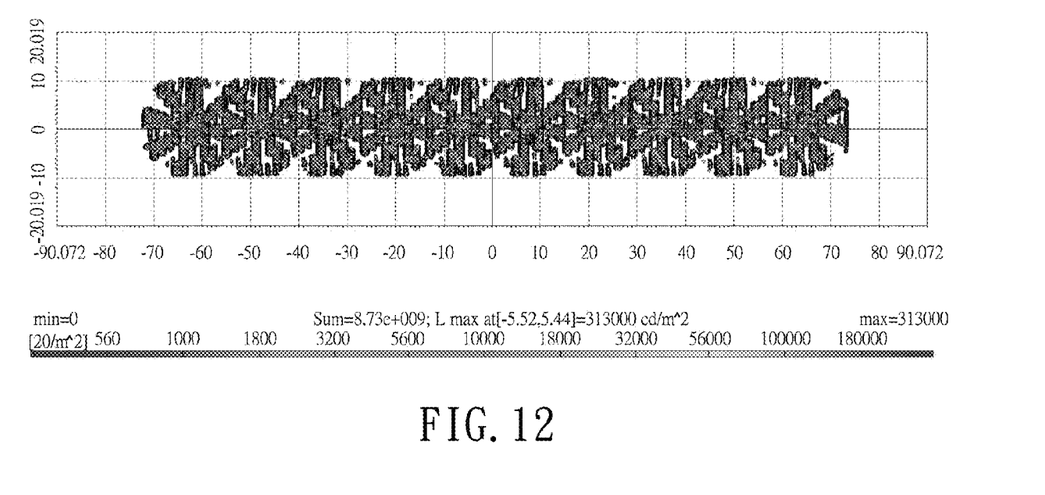
FIG. 12 is a schematic drawing showing light patterns generated after one of the light sources in FIG. 11 turned on according to the present invention.
Figure 13:
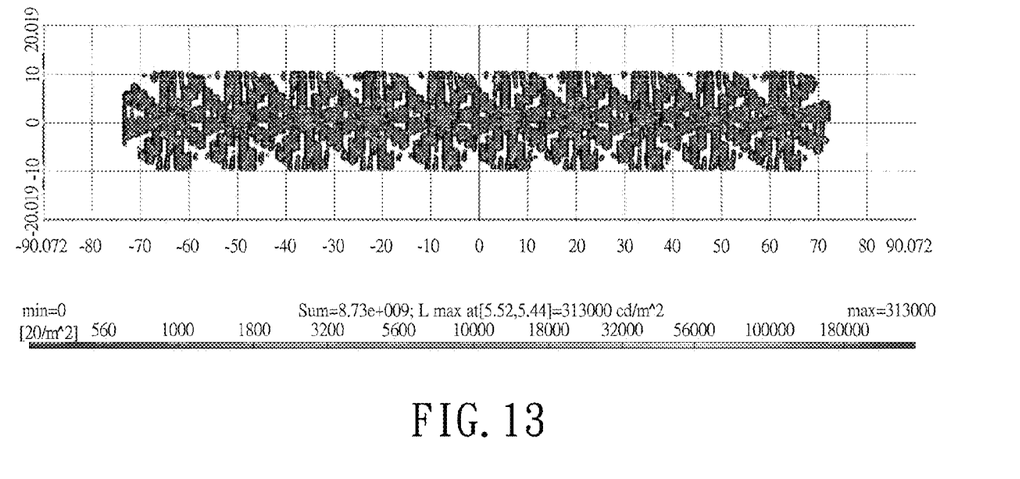
FIG. 13 is a schematic drawing showing light patterns generated after the other light source in FIG. 11 turned on according to the present invention.

Refer to FIG. 10 and FIG. 11, the incident curved surface 1, the inner light-collecting curved surface 3, and the outer reflective curved surface 4 of each of the lenses A are equi-angularly divided into sixteen equal parts and each of the lenses A is provided with two light sources 61, 62. Refer to FIG. 12 reveals light patterns generated by light emitted from all of the light sources 61 and passed through the lenses A. The FIG. 9 shows light patterns of light emitted from all of the light sources 62 and passed through the lenses A.

When the light sources arranged at the focal points of the respective lenses of the strip light have different spectra, the trip light projects continuous light patterns with different spectra. Moreover, the trip light has more applications when lit time or lit way (such as trigger and always-on or trigger and blinking at time intervals) of the respective light sources is further controlled. For example, two light sources with different spectra including daytime running light and direction indicating light are provided. The light source which emits daytime running light is controlled to be always-on once being triggered while the light source emitting direction indicating light is flashing at certain intervals once being triggered. Thereby a light fixture with the present lens A works as a daytime light when the light source emitting daytime running light is triggered and lit. If the light source which emits direction indicating light is triggered and lit, the light fixture with the present lens A is used as a direction indicator light (turn signal).

In a preferred embodiment, a transparent light cover (not shown in figure) is disposed outside the emergent curved surface 2 and provided with light scattering patterns on an inner surface thereof for further modifications of the light patterns of light passed through the multifocal lens of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A multifocal lens comprising a lens provided with an incident curved surface and an emergent curved surface arranged opposite to the incident curved surface;
   wherein the incident curved surface includes a plurality of incident areas disposed circularly around an axis and each of the incident areas is formed by a plurality of incident surfaces; the incident surfaces of the same incident area are not adjacent to and in contact with each other while each of the incident areas has a corresponding focal point.

2. The multifocal lens as claimed in claim 1, wherein the incident surfaces of the respective incident areas are equi-angularly and circularly disposed around the axis.

3. The multifocal lens as claimed in claim 2, wherein the number of the incident surfaces disposed circularly around the axis is a multiple of the number of the focal points.

4. The multifocal lens as claimed in claim 3, wherein the focal points are sequentially corresponding to the incident surfaces disposed circularly around the axis in an alternate manner and the two adjacent incident surfaces are corresponding to the different focal points.

5. The multifocal lens as claimed in claim 4, wherein the lens further includes an inner light-collecting curved surface and an outer reflective curved surface; the inner light-collecting curved surface which is connected with the incident curved surface works together with the incident curved surface to define a slot while the outer reflective curved surface connects the inner light-collecting curved surface with the emergent curved surface.

6. The multifocal lens as claimed in claim 5, wherein the inner light-collecting curved surface includes a plurality of inner light-collecting areas which is arranged around the axis circularly; each of the inner light-collecting areas is formed by a plurality of inner light-collecting surfaces; the inner light-collecting surfaces of the same inner light-collecting area are not adjacent to and in contact with one another and each of the inner light-collecting areas has a corresponding focal point.

7. The multifocal lens as claimed in claim 6, wherein the inner light-collecting surfaces of the respective inner light-collecting areas are equi-angularly and circularly arranged around the axis.

8. The multifocal lens as claimed in claim 7, wherein the number of the inner light-collecting surfaces arranged circularly around the axis is a multiple of the number of the focal points.

9. The multifocal lens as claimed in claim 8, wherein the focal points are sequentially corresponding to the inner light-collecting surfaces arranged circularly around the axis in an alternate manner and the two adjacent inner light-collecting surfaces are corresponding to the different focal points.

10. The multifocal lens as claimed in claim 9, wherein the outer reflective curved surface includes a plurality of outer reflective areas which is arranged around the axis circularly; each of the outer reflective areas is composed of a plurality of outer reflective surfaces; the outer reflective surfaces of the same outer reflective area are not adjacent to and in contact with one another and each of the outer reflective areas has a corresponding focal point.

11. The multifocal lens as claimed in claim 10, wherein the outer reflective surfaces of the respective outer reflective areas are equi-angularly and circularly disposed around the axis.

12. The multifocal lens as claimed in claim 11, wherein the number of the outer reflective surfaces disposed circularly around the axis is a multiple of the number of the focal points.

13. The multifocal lens as claimed in claim 12, wherein the focal points are sequentially corresponding to the outer reflective surfaces disposed circularly around the axis and the two adjacent outer reflective surfaces are corresponding to the different focal points.

14. The multifocal lens as claimed in claim 13, wherein at least one light source is disposed at each of the focal points and the light sources have different spectra.

15. The multifocal lens as claimed in claim 14, wherein a transparent light cover is disposed outside the emergent curved surface and provided with light scattering patterns on an inner surface thereof.

\* \* \* \* \*